United States Patent
Tse

(10) Patent No.: US 9,253,022 B2
(45) Date of Patent: Feb. 2, 2016

(54) MANAGED OBJECT VERSION IDENTIFICATION

(71) Applicant: Edwin Tse, Montreal (CA)

(72) Inventor: Edwin Tse, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 223 days.

(21) Appl. No.: 13/916,837

(22) Filed: Jun. 13, 2013

(65) Prior Publication Data

US 2013/0339508 A1 Dec. 19, 2013

Related U.S. Application Data

(60) Provisional application No. 61/659,104, filed on Jun. 13, 2012.

(51) Int. Cl.
*G06F 15/173* (2006.01)
*H04L 12/24* (2006.01)

(52) U.S. Cl.
CPC .......... *H04L 41/044* (2013.01); *H04L 41/0233* (2013.01); *H04L 41/0853* (2013.01); *H04L 41/0873* (2013.01)

(58) Field of Classification Search
None
See application file for complete search history.

(56) References Cited

U.S. PATENT DOCUMENTS

| | | | | |
|---|---|---|---|---|
| 6,226,788 B1* | 5/2001 | Schoening | .......... | H04L 41/0213 709/203 |
| 6,275,853 B1* | 8/2001 | Beser | .......... | H04L 41/046 709/223 |
| 6,549,943 B1* | 4/2003 | Spring | .......... | H04L 41/12 709/201 |
| 6,769,124 B1* | 7/2004 | Schoening | .......... | G06F 9/4435 707/999.1 |
| 6,895,435 B2* | 5/2005 | Tanaka | .......... | H04L 41/0233 709/202 |
| 7,529,821 B1* | 5/2009 | Cannon | .......... | H04L 41/044 709/223 |
| 2002/0176423 A1* | 11/2002 | Godin | .......... | H04L 41/046 370/395.2 |
| 2005/0120103 A1* | 6/2005 | Godin | .......... | H04L 41/22 709/223 |
| 2005/0278709 A1* | 12/2005 | Sridhar | .......... | G06F 8/24 717/136 |
| 2006/0015617 A1* | 1/2006 | Castro | .......... | H04L 41/022 709/226 |
| 2007/0055701 A1* | 3/2007 | Tse | .......... | G06F 17/30575 1/1 |
| 2008/0052385 A1* | 2/2008 | Yang | .......... | H04L 41/0206 709/223 |
| 2008/0147838 A1* | 6/2008 | Hirsch | .......... | H04L 41/28 709/223 |

FOREIGN PATENT DOCUMENTS

WO 2004046963 A1 6/2004

OTHER PUBLICATIONS

Vens et al., Decision Trees for Hierarchical Multi-label Classification, Journal Machine Learning, vol. 73, Issue 2, Nov. 2008, pp. 185-214, Kluwer Academic Publishers, Hingham, MA, USA.

(Continued)

*Primary Examiner* — Wing F Chan
*Assistant Examiner* — Padma Mundur
(74) *Attorney, Agent, or Firm* — Ericsson Canada Inc.

(57) ABSTRACT

Systems and methods for determining a version of a standard publication that is supported by a network element are provided. Version map information is requested and received from an external node in a managed network, including publication identifiers for at least one of the network elements. Each network element identified in the version map has an associated publication version and an indication of if the publication can be applicable to its directly or indirectly inferior nodes in the hierarchical instance tree. If a particular network element does not have a corresponding publication identifier in the received version map information, it can be determined if the network element can use the publication identifiers of a superior network element in the hierarchy.

11 Claims, 5 Drawing Sheets

(56) References Cited

OTHER PUBLICATIONS

3GPP, 3rd Generation Partnership Project; Technical Specification Group Services and System Aspects; Telecommunication management; Study on version handling over Itf-N (Release 11), Technical Report: 32.830 V1.3.0, Feb. 2012, pp. 1-32.

Aura Marcos, International Search Report of PCT/IB2013/054859, European Patent Office, The Netherlands, Apr. 10, 2013.

* cited by examiner

MANAGED OBJECT VERSION IDENTIFICATION

CROSS-REFERENCE TO RELATED APPLICATION

This application claims the benefit of U.S. Provisional Application No. 61/659,104 filed Jun. 13, 2012.

TECHNICAL FIELD

This disclosure relates generally to systems and methods for enabling publication version control for a hierarchy of managed objects.

BACKGROUND

A network consists of nodes and links. Nodes and links which are subject to network management can be referred to as Network Elements (NEs). A large communication network can consist of hundreds of thousands of such NEs for the purpose of transporting information or services amongst the users or subscribers of the network.

Referring to FIG. 1, this exemplary network management network 100 is a three-level hierarchical network management system. The use of such multiple level management hierarchy has been internationally standardized by standardization groups such as 3GPP TS 32.101 "Telecommunication management". The objective of such management hierarchy is to allow the Network Management System (NMS) 101 to manage the network elements (NEs) 109$a$-109$g$ and the functions running inside the NEs via a Domain Manager (DM) 102 such that all NMS management commands (e.g. a command to shut down a particular NE) are sent from the NMS 101 to the DM 102 who in turn would send the commands to the NEs 109$a$-109$g$.

The NMS 101 does not have direct connections or interactions with the NEs 109$a$-109$g$. The NMS 101 interacts with the DM 102 via a standard interface 103. The DM 102, on behalf of NMS 101, manages the NEs 109$a$-109$g$ often using proprietary interface(s) 108. A single NMS can interact with a number of DMs, and likewise, a DM may receive instructions from multiple NMSs.

The DM 102 holds, or can access, a Managed Information Base (MIB) 105 that is a stored representation of the NEs 109$a$-109$g$ under management. In this MIB 105, each managed NE 109$a$-109$g$ is represented by a software object called an Information Object Class (IOC) instance, or can also be referred to as a Managed Object. A Managed Object (MO) is a software object that can encapsulate the manageable characteristics and behaviour of a particular network resource. The quality of the DM 102 is largely measured by the accuracy and the timeliness of the information captured in the IOC instances reflecting the conditions and status of the deployed NEs.

Similarly, the NMS 101 holds, or can access, its own MIB 104 that is a copy of the DM MIB 105.

The NE configuration data and status are represented in the corresponding IOC instances in the DM MIB 105. In addition, these IOC instances are organized into a name-hierarchy or name tree according to rule and convention as may be specified in international standard such as 3GPP TS 32.300 Configuration Management, Name convention for Managed Objects. In this scheme, one IOC instance represents one NE under management. Each IOC instance has a unique name called a "Distinguished Name". The number of NEs 109$a$-109$g$ under management is equal to the number of IOC instances in the DM MIB 105.

An IOC instance, in the parlance of object oriented language, is the instance of a class. Organizations such as 3GPP have defined such classes for mobile network management. The standard organizations publish the class definitions periodically to handle the addition of new class definitions or to handle enhancement of existing class definitions. The standard organizations typically assign a unique identifier for each publication, called a publication identification or a publication identifier.

Each IOC instance, or Managed Object, represents a real network resource in a mobile network that can be managed, e.g. a base station or a radio cell which can be created, configured, read and updated throughout their lifetime until they are deleted.

An implementation of an object-oriented information model, such as a Telecommunications Operations Support System, will have a large containment tree of all instantiated Managed Objects contained by the "root" instance or by one of the Managed Objects contained by the "root" instance or further down the containment hierarchy. This containment tree is a structured way of representing the data that can be accessed through an interface. Containment is herein in the first place meant as "name-containment" as defined in 3GPP TS 32.152, building up a structured tree-like hierarchy in arbitrary number of levels by means of the <<names>> relationship. This enables unique identification of each Managed Object by means of its Distinguished Name. This hierarchical tree of all instances, from the root instance, including all directly or indirectly contained Managed Objects, down to all "leaves", is referred to as the MIB. A Managed Object instance that contains another one is referred to as the superior (e.g. the parent), whereas the contained Managed Object instance is referred to as the subordinate or inferior (e.g. the child). The MIB is made up of instances of classes which define the relevant published standard specification(s) for each Managed Object.

In a network that has been in operation for years, it is typical for NEs of the same kind or type (i.e. NEs that are radio base stations) to not use the same class definition. Similar NEs may use class definitions defined by different publications or versions by the standard organization. For example, two radio base stations can be represented by two IOC instances and their class definitions may be different in that one class definition of radio base station is published in 2001 and the other class is published in 2002.

In order for meaningful communication between the NMS 101 and the DM 102, it is important that the NMS 101 knows the Distinguished Name for all IOC instances stored in the DM MIB 105 and the class definitions used by the DM 102 for the IOC instances in the DM MIB 105. Otherwise, network management problems or errors can occur if the NMS 101 and DM 102 are using IOC definitions of different standard versions (e.g. different publication identifiers) for the same IOC instance.

SUMMARY

It is an object of the present invention to obviate or mitigate at least one disadvantage of the prior art.

In a first aspect of the present invention, there is provided a method for determining a publication version supported by a network element, for execution by a Network Management System entity managing a hierarchical arrangement of network elements. A version map message is received from an external node. A first network element is selected from the hierarchical arrangement for processing. In response to determining that the selected first network element does not have a corresponding entry in the received version map message, a second network element is identified that is superior to the first network element in the hierarchical arrangement. It is determined that the first network element supports a version of a standard publication associated with the second network element.

In an embodiment of the first aspect, the method further comprises identifying a third network element that is superior to the first network element in the hierarchical arrangement, and determining that the first network element does not support a version of a standard publication associated with the third network element. The steps of identifying the third network element and determining that the first network element does not support the version of the standard publication associated with the third network element can be performed prior to the step of identifying the second network element.

In another embodiment, the version map message is received in response to sending a request to the external node. The version map message can contain a list of entries, each entry specifying a network element and a version of a standard publication supported by the network element. The version map message can also include an inheritability indicator for each entry. The inheritability indicator can indicate that the version of the standard publication supported by the specified network element is also supported by network elements that are inferior to the specified network element in the hierarchical arrangement.

In another embodiment, the selected first network element is compared to the list of entries in the received version map message to determine that the selected first network element does not have a corresponding entry.

In another embodiment, it is determined that the identified second network element has a corresponding entry in the received version map message. The step of determining that the first network element supports the version of the standard publication associated with the second network element can include checking an inheritability indicator associated with the second network element in the received version map message. The step of determining that the first network element supports the version of the standard publication associated with the second network element can include determining that the version of the standard publication contains a class definition corresponding to the first network element.

In another embodiment, the second network element is identified by selecting a nearest superior network element in the hierarchical arrangement of network elements.

In another embodiment, responsive to determining that at least one network element in the hierarchical arrangement does not have an associated publication identifier, a new network element can be selected for processing.

In a second aspect of the present invention, there is provided a Network Management System node comprising a communication interface, a processor and a memory. The memory contains instructions executable by the processor. A version map message is received, at the communication interface, from an external node. A first network element is selected from a hierarchical arrangement of network elements. In response to determining that the selected first network element does not have a corresponding entry in the received version map message, a second network element is identified that is superior to the first network element in the hierarchical arrangement. It is determined that the first network element supports a version of a standard publication associated with the second network element.

In an embodiment of the second aspect, the communication interface is configured to send a request to the external node for the version map message.

In another embodiment, the processor can be configured to compare the selected first network element with the list of entries in the received version map message.

In another embodiment, the processor can be configured to determine that the identified second network element has a corresponding entry in the received version map message. The processor can be further configured to check an inheritability indicator associated with the second network element in the received version map message. The processor is configured to determine that the version of the standard publication contains a class definition corresponding to the first network element.

In another embodiment, the processor can be configured to identify the second network element by selecting a nearest superior network element in the hierarchical arrangement of network elements.

In another embodiment, the determined version of the standard publication is stored with an identifier of the first network element in the memory.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present disclosure is directed to a system and method for enabling version control of specification publications for a variety of network elements in a managed network.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

As discussed above, as a network evolves, different NEs in the deployed network can be supported by different publications and/or versions of standard specifications. Thus it is crucial for both the NMS 101 and the DM 102 to be aware of the publication identifiers of each IOC instance representing the NEs 109*a*-109*g* that are under management.

The NMS 101 is aware of the Distinguished Names for all IOC instances that it can use for the purpose of managing the network. NMS 101 holds a copy of all relevant class definitions. The DM 102 can build, via interface 107, its DM MIB 105. The DM 102 is aware of the Distinguished Names for all IOC instances in its DM MIB 105. For each IOC instance in the DM MIB 105, the DM 102 is aware of its associated class definition and the publication identifier.

Since a class (e.g. class=radio base station, cell, etc.) definition can appear in multiple publications and/or versions (i.e. a class can have multiple publication identifiers), and their class definitions may differ due to technology evolution, the NMS 101 may face a scenario where it does not know which class definition should be used for a particular IOC instance in the MIB.

Figure 2:
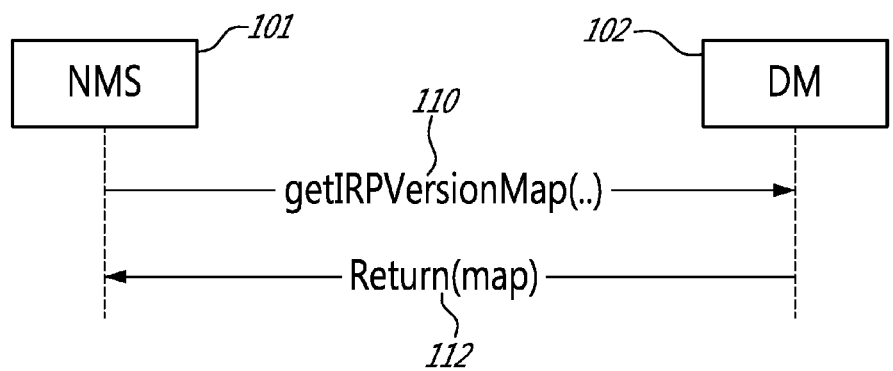
FIG. 2 is a call flow diagram.

As shown in FIG. 2, the NMS 101 can invoke the getIRPVersionMap operation via interface 103 to obtain the publication identifiers to be used to determine the class definitions for the IOC instances. FIG. 2 illustrates the sequence diagram of this operation.

NMS 101 sends a getIRPVersionMap message 110 to DM 102 to request the publication identifiers of the standard body publications related to class definitions used by the DM MIB 105 IOC instances. In one embodiment of the present invention, the getIRPVersionMap message 110 does not require any input parameters. The DM 102, on reception of getIRPVersionMap message 110, consults its DM MIB 105 via interface 107 and builds a "map" (also referred to as a version map) of the publication identifiers of class definitions used by the various NEs under management of the DM 102. DM 102 responds, using the version map output parameter 112 which carries the requested information. DM 102 returns the version map information message 112 to NMS 101 via interface 103.

Based on the version map returned by DM 102, NMS 101 can now identify the publication version where each IOC instance class definition is specified. The NMS 101 can consult its stored copies of the publications and identify the class definitions for each of the IOC instances. The NMS 101 can capture such information and update its associated MIB 104 via interface 106.

The version map message 112 can be defined as a list of elements where each element is a set of: {Distinguished Name (dN), Publication Identifier (pIdentifier), scope}. The dN field carries the Distinguished Name of the IOC instance. In a version map, a particular dN cannot occur more than once. The pIdentifier field carries one or more publication identifier(s). Each publication identifier identifies a publication containing multiple IOC definitions. The scope field holds either a "true" or "false" value. "True" indicates that the class definition(s) specified in the publication(s) identified would only apply to the IOC instance identified by the associated dN. "False" indicates that the class definition(s) specified in the publication(s) identified would apply to the IOC instances in an instance tree whose parent tree-node is the IOC instance identified by the associated dN. In other words, the version map message 112 is an ordered list which maps at least one Managed Object name to one or more associated publication identifier. Each entry in the list also has an inheritability indicator defined by the scope parameter.

In an embodiment of the present invention, a MIB of a network has X number of IOC instances. Each IOC instance has a unique dN. Suppose that a version map has Y number of elements. The number of Y cannot be greater than X, as the number of elements cannot exceed the number of IOC instances. Theoretically, Y can be equal to X, but this is unlikely since one publication would typically contain multiple IOC class definitions. In a conventional telecommunication network, Y is less than X. In this case, the version map information might not contain information explicitly related to each and every IOC instance in the MIB. The number of dNs that are in the version map may be less than the number of dNs (or IOC instances) in the MIB.

Figure 3:
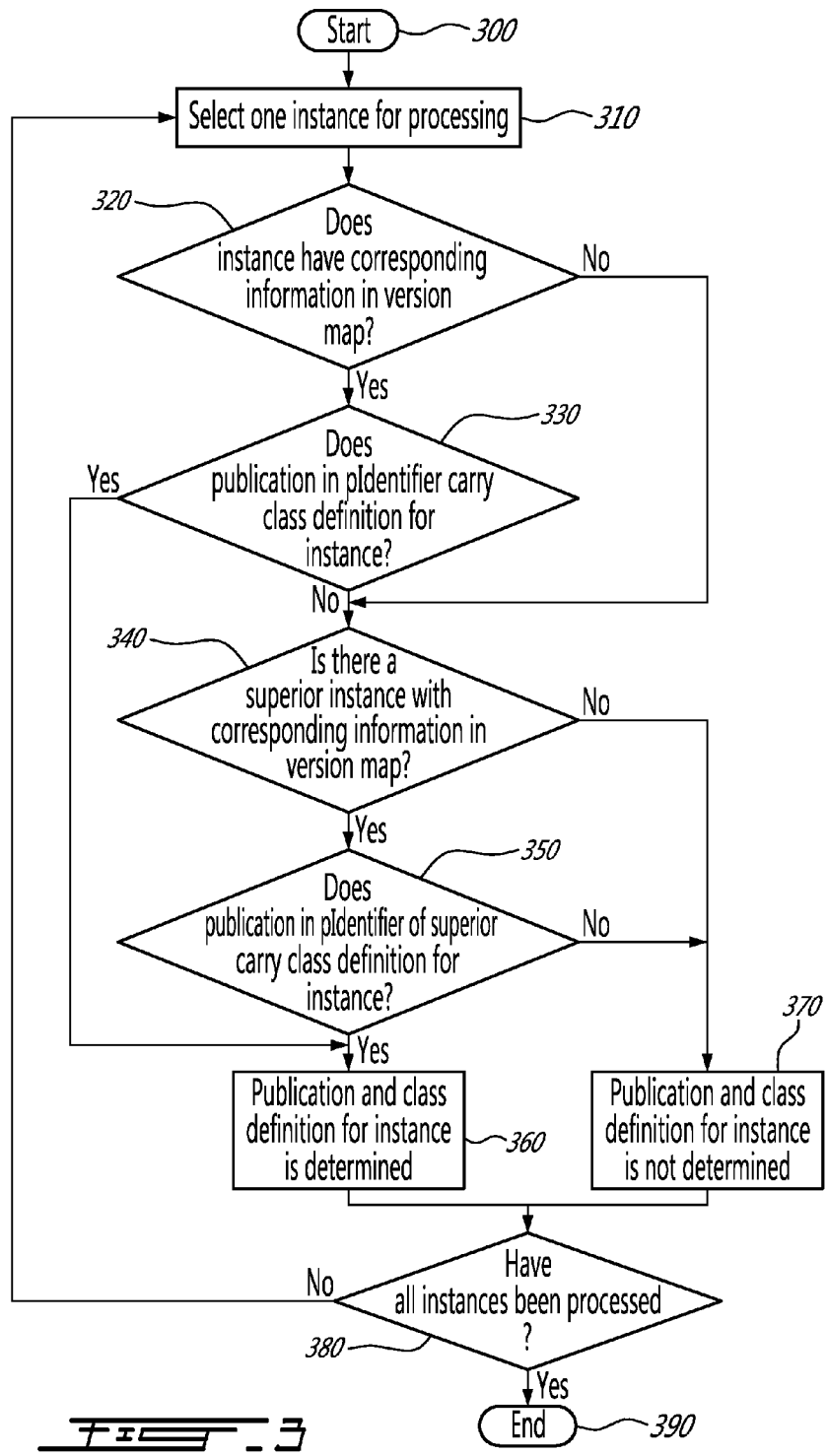
FIG. 3 is a flow chart illustrating an embodiment of the present invention.

FIG. 3 illustrates a set of rules to interpret the version map information so it can be applied to all IOC instances stored in an MIB for the network. The method of FIG. 3 can be implemented by an entity such as NMS 101 when processing version map information received from DM 102.

The method begins in block 300. It assumed that the NMS has access to both an instance tree, which defines a hierarchical arrangement between the network elements that are represented by the IOC instances, stored in the MIB and a received version map. In block 310, a first IOC instance is selected for processing. In block 320 it is determined whether the selected IOC instance has information corresponding to it in the received version map message. This determination can be made by comparing the name of the selected IOC instance to the list of distinguished names in the version map to determine if there is a corresponding entry (e.g. name, pIdentifier, scope) in the version map message. If no, a second IOC instance can optionally be selected for processing (not shown in FIG. 3). If yes, it is determined if the specification identified by the pIdentifier field corresponding to the selected IOC instance carries the class definition for the IOC instance (block 330). For example, if the IOC instance is an ENodeB, it is determined if the specification identified by the pIdentifier carries a class definition for the class "ENodeB". If the specification has the appropriate class definition, then the publication version with the correct class definition for the selected first IOC instance is found, and can be stored in the MIB (block 360).

If the answer is no to the determination in either block 320 or block 330, the NMS determines if there is a superior IOC instance (e.g. the selected IOC instance is directly or indirectly name-contained by the superior IOC instance) in the instance tree that has corresponding information and with a scope element of "False" in the version map (block 340). As previously discussed, a scope element of "False" indicates that the publication version associated with the superior instance is also supported by its inferior instances in the hierarchy. If a superior IOC instance is identified that has corresponding information in the version map, the NMS can check if the class definition exists in the publication identified by the pIdentifier field of the superior IOC instance (block 350). If yes, the selected first IOC instance can use the class definition in the publication version identified by its nearest superior (block 360).

In the case where the NMS determines that there is no superior IOC instance for the first selected IOC instance (block 340), or the identified superior does not carry the appropriate class definition for the selected IOC instance (block 350), the publication version and class definition is determined to be not found (block 370). In some embodiments, blocks 340 and 350 may be repeated a number of times if the selected IOC instance has multiple superior instances in the hierarchy. An instance can use the publication associated with its nearest superior in the hierarchy, provided it carries the correct class definition for the instance and it has a scope element of "False", indicating that the publication is inheritable.

In block 380 it is determined if all IOC instances in the instance tree have been processed. If no, the process returns to block 310 to select a second IOC instance for processing. When all IOC instances in the MIB have been processed, the process ends (block 390) and the NMS can update or replace its stored MIB with the new version map information.

Figure 1:
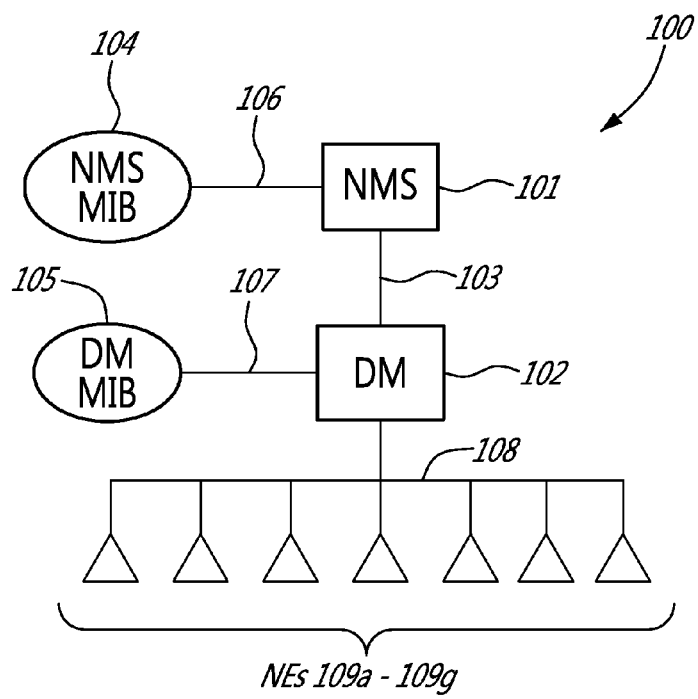
FIG. 1 is a block diagram of an example Network.
Figure 4:
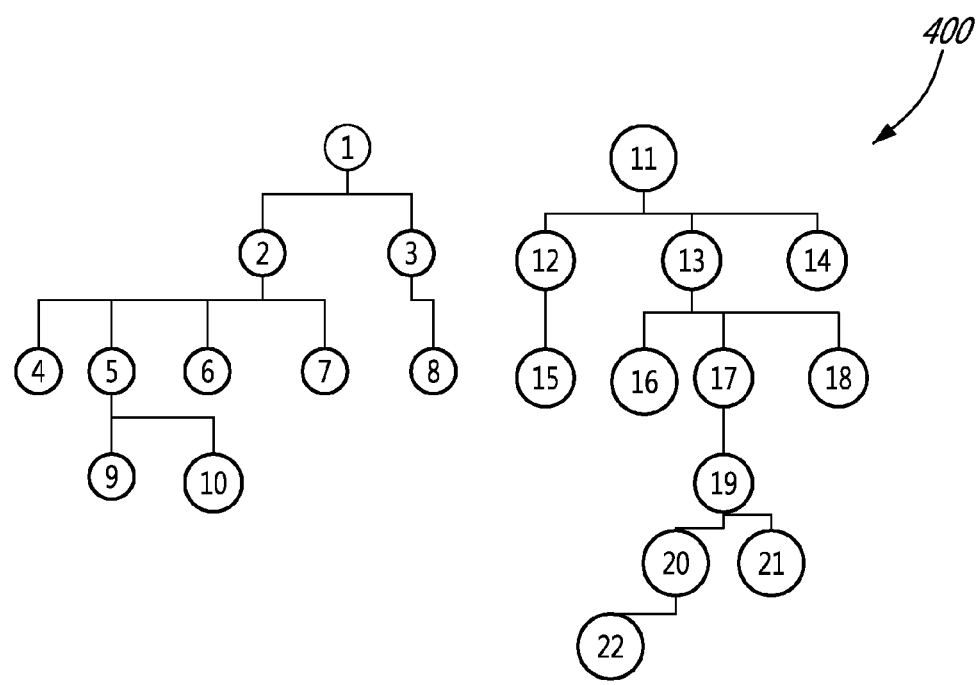
FIG. 4 is an example instance tree.

FIG. 4 is an exemplary IOC instance tree 400 as can be stored in an NMS MIB such as 104. FIG. 4 will be used to illustrate example use cases for received version map information. It should be noted that the hierarchical arrangement of the instance tree that forms a MIB may or may not correspond to the hierarchy of the network elements in the network itself, as shown in FIG. 1. It should also be noted that a global root instance is not shown in this figure. Each network element is identifier by its distinguished name, dN 1-22. For example, dN 1 can be a sub-network with ENodeB's dN 2 and dN 3. dN 4, 5, 6 and 7 can be cells under dN 2, and dN 8 can be a cell under dN 3. dN 9 and 10 can be repeaters under dN 5.

In a first example, the returned information is version map={1, (a,b), FALSE}. Class definitions for dN 1 should be found in publications a and b. Class definitions for dNs 2 through 10 are found in the same publications as their superior, dN 1, as the scope element is False. Class definitions for dNs 11-22 are not known.

In a second example, the returned information is version map={1, (a,b), FALSE; 5, k, TRUE}. Class definitions for dNs 1 through 10 should be found in publications a and b. Class definition for dN 5 is an exception and should be found in publication k. If no class definition for dN 5 exists in publication k, it should fallback to be found in publications a and b. Class definitions for dNs 11-22 are not known.

In a third example, the returned information is version map={1, (a,b), FALSE; 11, (a,b,c), FALSE; 13, d, TRUE; 19, e, FALSE}. Class definitions for instances dN 1 through dN 10 should be found in publications a and b. Class definitions for instances dN 11 through dN 22, except instances dN 13 and dN 19 through dN 22, should be found in publications a, b, and c. Class definition for instance dN 13 should be found in publication d. If not, it should be found in publications a, b, and c. Class definition for instances dN 19 through dN 22 should be found in publication e. If not, it should be found in publications a, b, and c.

In an alternative embodiment, the getIRPVersionMap message as described above can include an input parameter. The usage of getIRPVersionMap without an input parameter allows an NMS to indicate that it requests information for all IOC instances. The usage of the alternative getIRPVersionMap message with input parameters allows an NMS to indicate that it requests information for only some specific IOC instances (e.g. dN 8 and dN 16 of FIG. 4) or for a particular branch of the tree (e.g. dN 5, 9, 10 of FIG. 4).

The getIRPVersionMap input parameter can be a set of elements: {dN, scope}. The dN element again carries the Distinguished Name of the IOC instance. The input parameter should not have a DN appearing more than once. The scope element can carry either a "true" or "false" value. "True" indicates that NMS requests the publication identifier(s) for an IOC instance identified by the associated dN element. "False" indicates that NMS requests publication identifier(s) for IOC instances that form a tree, whose top tree-node is the IOC instance identified by the associated dN element (e.g. in FIG. 4, dN 5 is the top tree-node of a tree that is made up of dN 5, 9 and 10).

Figure 5:
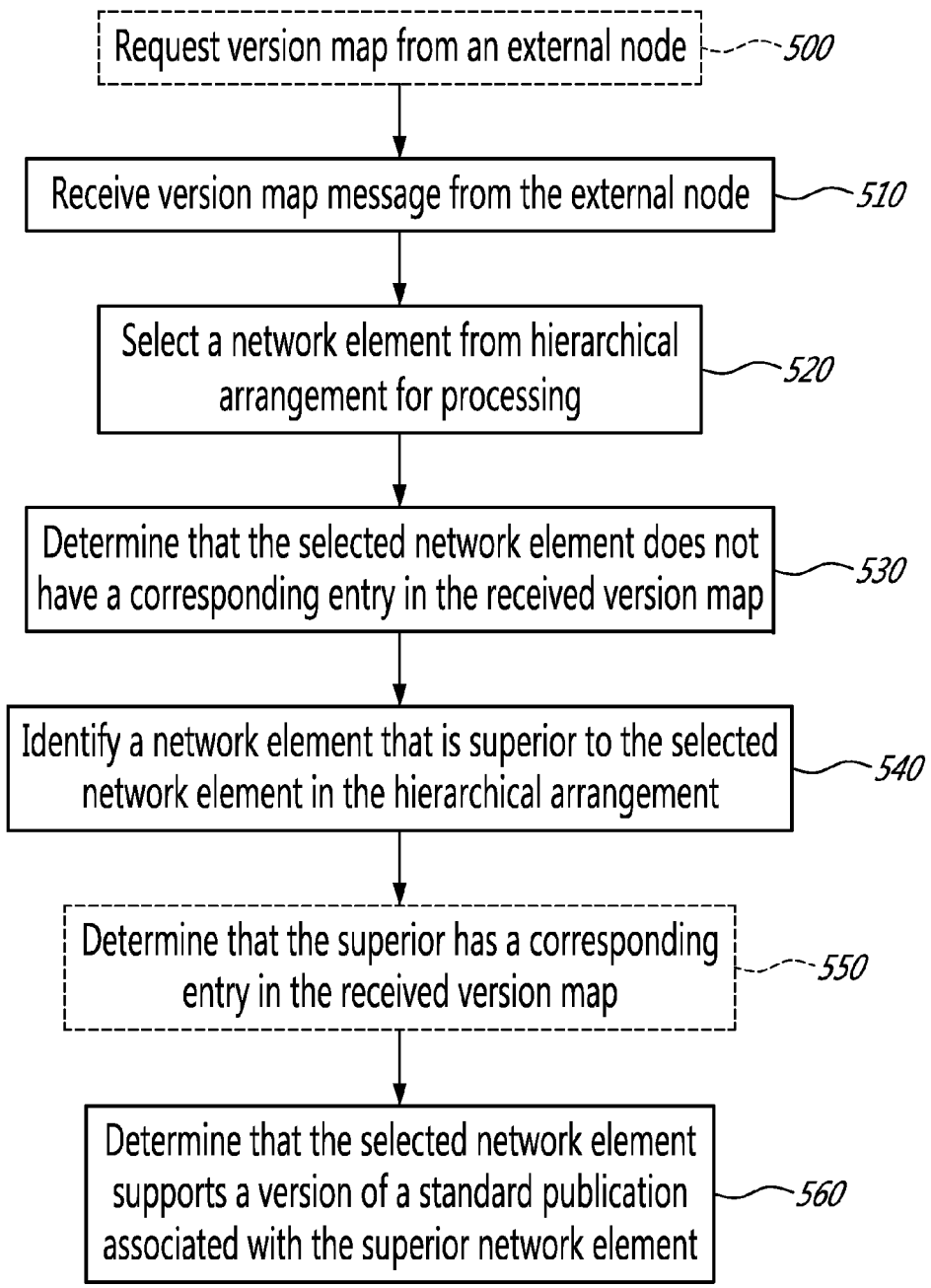
FIG. 5 is a flow chart illustrating an embodiment of the present invention.

FIG. 5 is a flow chart illustrating an embodiment of the present invention for determining a publication version supported by a network element in a hierarchy of network elements. The process can optionally begin in step 500 by requesting a version map from an external node, such as a DM. A version map message is received from the external node in step 510 and can be optionally received in response to the request sent in step 500. The version map message can contain a list of entries, each entry specifying a particular network element and a version of a standard publication supported by that network element. The version of the standard publication can be identifier by a publication identifier. The version map message can also include an inheritability indicator for each entry. The inheritability indicator can indicate whether the publication identifier is associated only with its corresponding network element, or if the publication identifier can also be associated with all other network elements that are directly or indirectly inferior to the network element in the hierarchy.

Alternatively, the method of FIG. 5 can begin without explicitly requesting and receiving the version map from an external node. A first network element is selected for processing from the hierarchical arrangement of network elements stored in the MIB in step 520. It is determined in step 530 that the selected managed object does not have a corresponding entry in the received version map message. This can be determined by comparing the selected network element with the list of entries contained in the version map message. It is thus determined that the selected network element does not have an associated publication identifier included in the received version map message.

In step 540, a network element that superior to the selected network element in the hierarchical arrangement is identified. A superior network element can be selected by processing the hierarchical arrangement of network elements. In step 550, it is optionally determined that the identified superior network element has a corresponding entry in the received version map and thus, that there is at least one version of a standard publication that is associated with the superior network element.

In step 560, it is determined that the selected network element supports the version of the standard publication that is associated with the identified superior network element. This determination can include checking an inheritability indicator associated with the superior network element and included in the corresponding entry of the version map. The inheritability indicator indicates that the version of the standard publication identified by the publication identifier in the version map is also supported by any network elements that are inferior to the superior network element in the hierarchical arrangement. The inheritability indicator can be contained in a scope field of the version map. The determination of step 560 can also include checking that the version of the standard publication associated with the superior network element contains a class definition which corresponds to the selected network element. For example, if the selected element is an ENodeB, the version of the standard publication must include a class definition for "ENodeB" in order for the publication to be supported by the selected network element.

In some embodiments, the superior network element identified in step 540 is the nearest superior node to the selected network element in the hierarchical arrangement of the instance tree. In some embodiments, it can be determined that the publication version associated with the superior network element is not supported by the selected network element. This can be due to any of several factors. For example, it can be determined that the superior does not have a corresponding entry in the received version map message. It can be determined that the superior does have a corresponding entry in the version map but its inheritability indicator indicates that the associated publication is not supported (or cannot be inherited by) its inferior nodes in the hierarchy. It can also be determined that the publication version associated with the superior network element does not carry a class definition which corresponds to the selected network element.

In the example embodiment where it is determined that the publication version associated with the nearest superior network element is not supported by the selected network element, a second nearest superior network element can be identified. It can be determined if a publication version associated with this second identified superior can be supported by the selected network element in a similar manner as previously described with respect to the first identified superior. This process can continue by identifying subsequent superior network elements until a publication version is found that can be supported by the selected network element.

The method of FIG. 5 can continue by selecting a second network element from the hierarchical arrangement for processing. The process can continue until all network elements of the hierarchy have been processed. An updated instance tree can store the publication identifiers with their associated network elements as determined from the received version map message and the methodology described.

Figure 6:
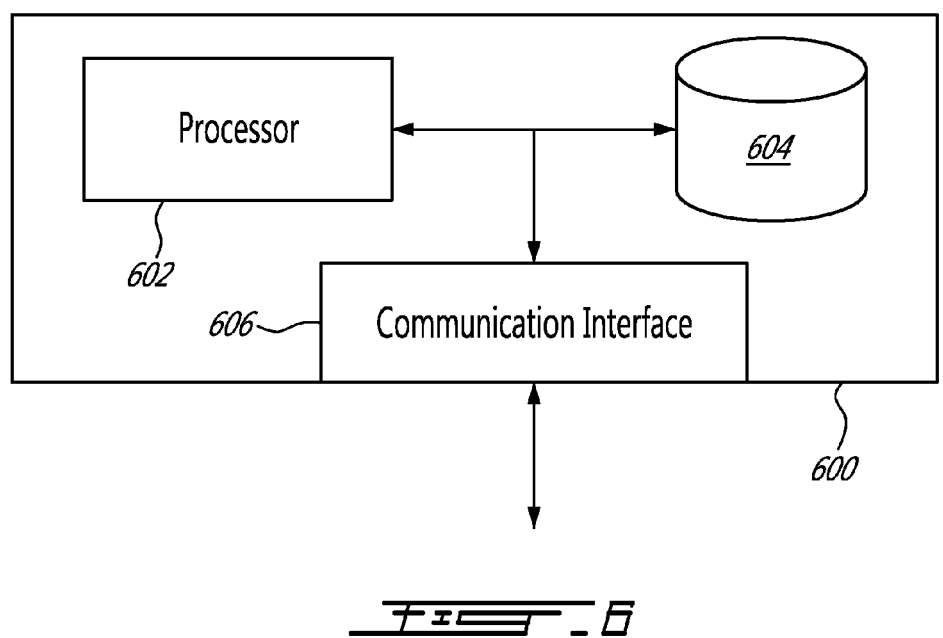
FIG. 6 is a block diagram illustrating an example NMS node.

FIG. 6 is a block diagram illustrating an example node 600 of the present invention. Node 600 can be an NMS entity as has been described herein. Node 600 includes a processor 602, a memory or data repository 604 and a communication interface 606. The memory 604 can be internal or external to node 600, and is accessible by the processor 602. The memory 604 contains instructions executable by the processor 602 whereby the node 600 is operative to perform the various embodiments of the present invention as described herein.

The communication interface 606 is configured to send a request for version information to a DM node in the network and receive a version map message in return. The processor 602 is configured to process network elements of a hierarchical arrangement stored in the memory 604 with respect to the received version map message. The processor 602 is configured to select a first network element from a hierarchical arrangement of network elements for processing. In response to determining that the selected first network element does not have a corresponding entry in the received version map message, the processor 602 identifies a second network element that is superior to the first network element in the hierarchical arrangement. The processor 602 is further configured to determine that the first network element supports a version of a standard publication associated with the second network element.

Once the network elements in the hierarchy have been processed, they can be stored with their respective supported publications in the memory 604.

Embodiments of the present invention allow for an NMS to determine the IOC instance class definitions used by an associated DM at run time. There is no need for the DM and NMS to establish a prior, common understanding of the class definitions of the IOC instances representing the managed network.

It is assumed that a new publication of a class definition (e.g. for radio base stations) contains additional features or capabilities. Further, it can be assumed that this new class definition is backward compatible with the older, previous definition (as specified in an older publication). The DM can upgrade some (but not necessarily all) radio base stations that are capable of being upgraded, and change the corresponding IOC instance definitions using the one in the new publication. The DM can perform this upgrade act without notifying any NMS. The NMS will, in turn, discover the new definition(s) at run time. The synchronization effort for any NEs (e.g. the radio base stations) being upgraded is thus minimized. This is advantageous considering the frequency of NE upgrades in a large telecommunication network and that one DM can be serving multiple NMS entities.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for determining a publication version supported by a network element, for execution by a Network Management System node managing a hierarchical arrangement of network elements, comprising the steps of:
   receiving a version map message from an external node, the version map message containing a list of entries, each entry including an identifier of a network element, a version of a standard publication supported by the network element, and an inheritability indicator, wherein the inheritability indicator indicates if the version of the standard publication supported by the network element is also supported by network elements that are inferior to the network element in the hierarchical arrangement;
   selecting a first network element from the hierarchical arrangement for processing;
   comparing the selected first network element with the list of entries in the received version map message;
   in response to determining that the selected first network element does not have a corresponding entry in the received version map message, identifying a second network element that is superior to the first network element in the hierarchical arrangement;
   determining that the identified second network element has a corresponding entry in the received version map message;
   determining that the first network element supports a version of a standard publication associated with the second network element in accordance with checking an inheritability indicator associated with the second network element in the received version map message; and
   storing the determined version of the standard publication with an identifier of the first network element.

2. The method of claim 1, further comprising:
   identifying a third network element that is superior to the first network element in the hierarchical arrangement; and
   determining that the first network element does not support a version of a standard publication associated with the third network element.

3. The method of claim 2, wherein the steps of identifying the third network element and determining that the first network element does not support the version of the standard publication associated with the third network element are performed prior to the step of identifying the second network element.

4. The method of claim 1, wherein the version map message is received in response to sending a request to the external node.

5. The method of claim 1, wherein the step of determining that the first network element supports the version of the standard publication associated with the second network element includes determining that the version of the standard publication contains a class definition corresponding to the first network element.

6. The method of claim 1, wherein the second network element is identified by selecting a nearest superior network element in the hierarchical arrangement of network elements.

7. The method of claim 1, further comprising, in response to determining that at least one network element in the hierarchical arrangement does not have an associated publication identifier, selecting a fourth network element for processing.

8. A Network Management System node comprising a communication interface, a processor and a memory, the memory containing instructions executable by the processor whereby the Network Management System node is operative to:
   receive, at the communication interface, a version map message from an external node, the version map message containing a list of entries, each entry including an identifier of a network element, a version of a standard publication supported by the network element, and an inheritability indicator, wherein the inheritability indicator indicates if the version of the standard publication supported by the network element is also supported by network elements that are inferior to the network element in the hierarchical arrangement;
   select a first network element from a hierarchical arrangement of network elements;
   compare the selected first network element with the list of entries in the received version map message;
   in response to determining that the selected first network element does not have a corresponding entry in the received version map message, identify a second network element that is superior to the first network element in the hierarchical arrangement;
   determine that the identified second network element has a corresponding entry in the received version map message;
   determine that the first network element supports a version of a standard publication associated with the second network element in accordance with checking an inheritability indicator associated with the second network element in the received version map message; and
   store the determined version of the standard publication with an identifier of the first network element in the memory.

9. The Network Management System node of claim 8, wherein the communication interface is configured to send a request to the external node for the version map message.

10. The Network Management System node of claim 8, wherein the processor is configured to determine that the first network element supports the version of the standard publication associated with the second network element by determining that the version of the standard publication contains a class definition corresponding to the first network element.

11. The Network Management System node of claim 8, wherein the processor is configured to identify the second network element by selecting a nearest superior network element in the hierarchical arrangement of network elements.

* * * * *